(12) United States Patent
Kostamovaara et al.

(10) Patent No.: US 11,947,009 B2
(45) Date of Patent: Apr. 2, 2024

(54) RANGE IMAGING APPARATUS AND METHOD

(71) Applicant: OULUN YLIOPISTO, Oulu (FI)

(72) Inventors: Juha Kostamovaara, Oulu (FI); Pekka Keränen, Oulu (FI)

(73) Assignee: Oulun yliopisto, Oulu (FI)

( * ) Notice: Subject to any disclaimer, the term of this patent is extended or adjusted under 35 U.S.C. 154(b) by 769 days.

(21) Appl. No.: 17/046,130

(22) PCT Filed: Apr. 4, 2019

(86) PCT No.: PCT/FI2019/050271
§ 371 (c)(1),
(2) Date: Oct. 8, 2020

(87) PCT Pub. No.: WO2019/197717
PCT Pub. Date: Oct. 17, 2019

(65) Prior Publication Data
US 2021/0026011 A1    Jan. 28, 2021

(30) Foreign Application Priority Data

Apr. 9, 2018    (FI) ..................................... 20185336

(51) Int. Cl.
*G01S 7/48*        (2006.01)
*G01S 7/481*       (2006.01)
(Continued)

(52) U.S. Cl.
CPC ............ *G01S 17/06* (2013.01); *G01S 7/4815* (2013.01); *G01S 7/4817* (2013.01); *G01S 7/4861* (2013.01); *G01S 17/89* (2013.01)

(58) Field of Classification Search
None
See application file for complete search history.

(56) References Cited

U.S. PATENT DOCUMENTS 7,787,105 B2    8/2010  Hipp
2004/0109155 A1*  6/2004  Deines .................... G01S 17/34
                                             356/28.5
(Continued)

FOREIGN PATENT DOCUMENTS

CN    102549381    7/2012
EP    3 168 641    5/2017
(Continued)

OTHER PUBLICATIONS

International Search Report for PCT/FI2019/050271 dated Jun. 14, 2019, 2 pages.
(Continued)

*Primary Examiner* — Hovhannes Baghdasaryan
(74) *Attorney, Agent, or Firm* — Nixon & Vanderhye PC

(57) ABSTRACT

A semiconductor laser source of a transmitter (102) in a range imaging apparatus (100) generates an optical pulse at repeated moments, and outputs spatially separate optical beams towards a target zone (114), such that the semiconductor laser source outputs each of the spatially separate of the optical beams at different moments from each other. A detector (105) of a receiver (104) comprises single-photon sub-detector units, at least two groups of the single-photon sub-detector units have separate field of views towards the target zone (114), and the at least two groups of sub-detector units are associated with different optical beams of the spatially separated optical beams on the basis of the separate field-of-views. A timing unit (106) determines a value corresponding to a time-of-flight of the optical pulse output at each of the repeated moments on the basis of a signal from a group of the sub-detector units associated with an optical beams output at said moment. In an embodiment, the semiconductor laser source comprises a plurality of sub-source units each of which may output a unique optical beam. In an embodiment, the timing unit (106) comprises a (Continued)

selector and a number of time-to-digital converters (108). The receiver selector connects a number of the sub-detector units, which detect the optical pulse (110) and the number of which corresponds to the number of output beams, with the number of the time-to-digital converters (108). In an embodiment, the apparatus (100) comprises an electric power source (192) which supplies a constant electric power to the semiconductor laser source at each of the repeated moments in order to increase brightness of the optical beams. Elongated optical beams may be produced by a laser diode bar (several emitting stripes) and a cylinder lens system or a holographic diffuser. Partially overlapping optical beams may provide illuminated rectangles of the optical beams on the target (112).

20 Claims, 6 Drawing Sheets

(51) Int. Cl.
*G01S 7/4861* (2020.01)
*G01S 17/06* (2006.01)
*G01S 17/89* (2020.01)

(56) References Cited

U.S. PATENT DOCUMENTS

| | | |
|---|---|---|
| 2011/0199002 A1 | 8/2011 | Kamiyama |
| 2015/0131080 A1 | 5/2015 | Retterath et al. |
| 2015/0362585 A1 | 12/2015 | Ghosh et al. |
| 2017/0155225 A1 | 6/2017 | Villeneuve et al. |
| 2017/0176579 A1 | 6/2017 | Niclass et al. |
| 2018/0062345 A1 | 3/2018 | Bills et al. |
| 2018/0259624 A1 | 9/2018 | Kiehn et al. |

FOREIGN PATENT DOCUMENTS

| | | |
|---|---|---|
| WO | 2017/112416 | 6/2017 |
| WO | 2017/178711 | 10/2017 |

OTHER PUBLICATIONS

International Preliminary Report on Patentability PCT/FI2019/050271 dated Jul. 24, 2020, 52 pages.
Search Report for FI20185336 dated Nov. 7, 2018, 2 pages.
Dec. 11, 2023 Office Action issued in Chinese Patent Application No. 201980031852.8, pp. 1-10 [machine translation included].

\* cited by examiner

RANGE IMAGING APPARATUS AND METHOD

This application is the U.S. national phase of International Application No. PCT/FI2019/050271 filed Apr. 4, 2019 which designated the U.S. and claims priority to FI Patent Application No. 20185336 filed Apr. 9, 2018, the entire contents of each of which are hereby incorporated by reference.

FIELD

The invention relates to a range imaging apparatus and method.

BACKGROUND

3D/2D range imaging has a huge forward potential that can be expanded to numerous areas, provided that the proposed imaging techniques would allow reliable, fast and essentially latency-free observation of environment dynamics. Applications of this kind can be found in vehicle control and guidance systems, drones, robotics, smart home, security (e.g. identification), man-machine communication (e.g. excavators, bore machinery), gesture control and consumer electronics (games), for example. These applications require a relatively high measurement rate, low cost and in many cases, a realisation in miniature quite comparable to that found in modern CMOS cameras.

The range imaging suffers from the noise produced by random photons in high background illumination conditions (bright sunlight), which is a serious problem for current technologies. Hence, there is a need to improve the measurements.

BRIEF DESCRIPTION

The present invention seeks to improve the range imaging. The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of a time-of-flight range finder apparatus;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

In an embodiment, the approach described below enables a use of the solid-state (no moving parts) scanning technique, in which the time of flight of a short, impulse-like (tens of picoseconds to tens of nanoseconds), energetic (0.1 . . . 100 nJ) optical pulse is measured with a 2D single-photon receiver chip. The optical pulses may be generated using novel semiconductor laser diodes while the receiver chip may be realised with scalable CMOS techniques. The receiver chip may also include the multichannel interval measurement electronics needed to capture the transit times of the photons. Novel time gating and illumination techniques may be used to suppress the noise produced by random photons in high background illumination conditions (bright sunlight), a major problem for current technologies.

Figure 1:
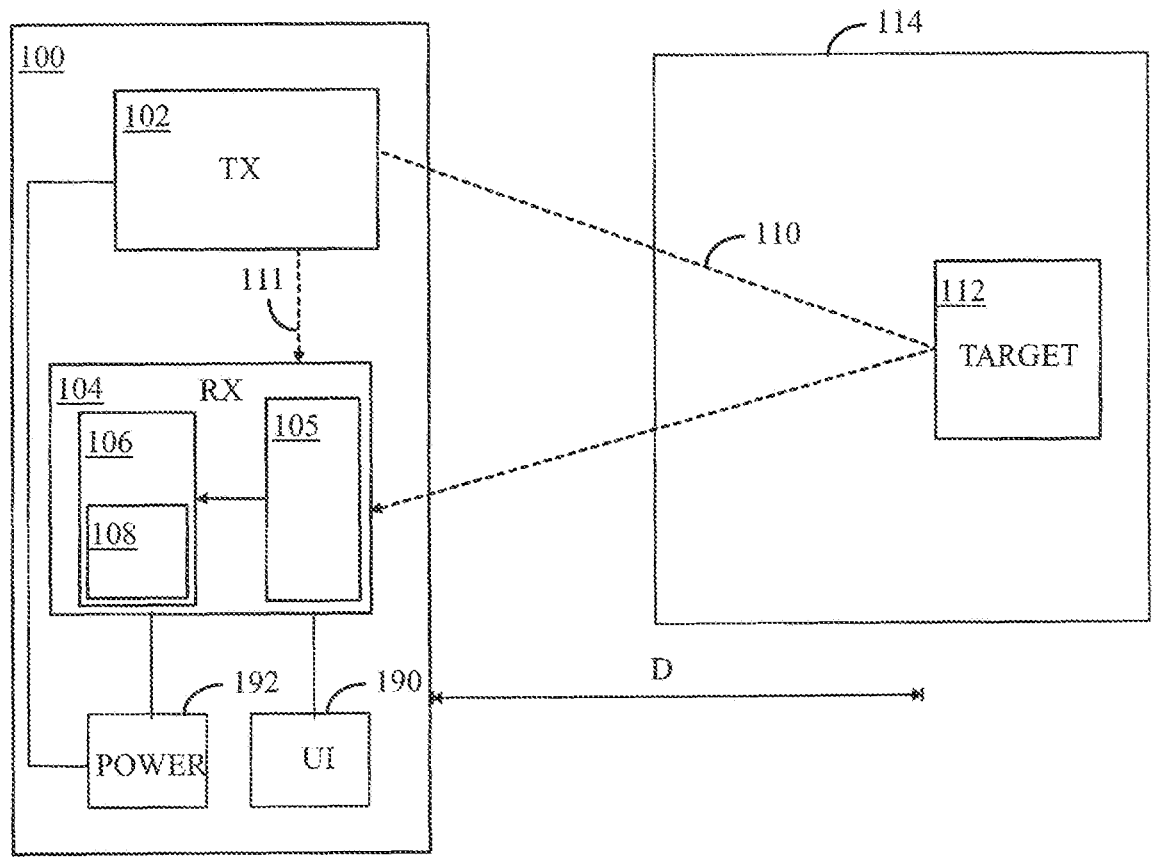

FIG. 1 illustrates an example of a range finder apparatus 100 for measuring a distance D between the range finder apparatus 100 and a target 112, which is in a target zone 114, on the basis of time-of-flights of repeatedly output optical pulses 110. The target 112 may be any object that reflects at least part of the optical pulse 110 back to a receiver 104 of the range finder apparatus 100.

The range finder apparatus 100 comprises a transmitter 102 that may transmit the optical pulse 110 towards the target 112 in a repeated manner. A timing unit 106 of the device 100 may measure a time interval between the transmission and reception of each of the optical pulses 110.

The timing unit 106 may be a part of the receiver 104 or it may be outside of the receiver 104. The timing unit 106 comprises at least one time-to-digital converter. A reception of an optical pulse 110 and its timing may be based on detection of amplitude crossing a amplitude threshold level with respect to a time scale. The amplitude threshold may be predefined or adaptive, for example. In general, the reception may be based on any suitable property crossing a threshold. The determination whether the property crosses the threshold may be performed digitally or analogically.

The optical pulse 110 transmitted from the transmitter 102 is shown in a dotted line. The transmitter 102 and the receiver 104 may be connected such that the optical pulse 110 transmitted towards the target zone 114 may also be simultaneously transmitted to the receiver 104 as well (see dashed line 111). The optical pulse 110 may be transmitted to the receiver 104 via a partially reflective mirror or prism or the like, which also directs part (usually a major part) of the optical pulse 110 transmitted towards the target zone 114, to the receiver 104 as a reference pulse 111, or the transmitter 102 may directly transmit another electrical or optical pulse to the receiver 104 as the reference pulse 111. The reference pulse 111 has a determined temporal dependence with respect to the optical pulse 110 transmitted towards the target zone 114. That is a moment at which the transmitter 102 outputs the optical pulse 110 towards the target zone 114 and it is a timing signal for a timing unit 106 to start measuring time between the transmission and reception of the optical pulse 110.

The transmitter 102 transmits the optical pulse 110 repeatedly. The repetition of the optical pulse 110 may be regular or irregular. The repetition may have a certain frequency, for example.

Figure 2:
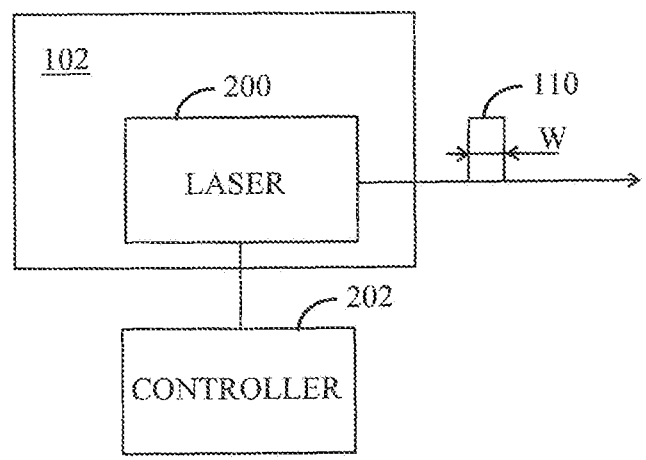
FIG. 2 illustrates an example of the transmitter.

As shown in the example of FIG. 2, the transmitter 102 comprises a pulsed semiconductor laser source 200 which transmits the short optical pulse 110 repeatedly. A semiconductor laser source 200 generates typically visible or infrared light. A bandwidth of a semiconductor laser source may be less than a few tens of nanometers without restricting to this. One or more narrow or broad bands of the optical radiation may be utilized.

In an embodiment, a timing of the optical pulse 110 may be controlled by a controller 202. In an embodiment, a duration of the optical pulse 110 may be adjustable by a controller 202. The optical pulse width may be controlled on the basis of a width of an electrical pulse which generates the optical pulse in the laser, for example. The optical pulse width may be controlled, additionally or alternatively, on the basis of a height of amplitude of an electrical pulse which generates the optical pulse in the laser, for example. To generate an optical pulse in a picosecond range, the laser may generate the optical pulse on the basis of gain-switching. The power of the optical pulse 110 may range from one watt to hundreds of watts, for example. As an example, the power of the optical pulse 110 may be about 20 W.

The receiver 104 may comprise a detector 105 that detects the optical pulse 110 reflected from the target 112 in the target zone 114. The detector 105 may also detect the reference pulse 111, when the reference pulse 111 is optical. The detector 105 has more than one detector elements which are single-photon sub-detector units 600 (see FIG. 6A). The detector 105 may comprise an array of the single-photon sub-detector units 600. The receiver 104 gathers the optical power reflected from the target zone 114 on the detector 105 such that no image of the target zone 114 needs to be formed on the detector 105. On the other hand, the receiver 104 may form an image of the target zone 114 on the detector 105. The image may be formed with at least one lens and/or at least one curved-surface mirror. The image may be focused or be out of focus. The at least one lens and/or the mirror may be focused at infinity, for example. A person skilled in the art is familiar with the receiver 104, per se.

When the receiver 104 receives the optical pulse 110 reflected from the target 112, a moment of the arrival of the optical pulse 110 may be a time instant at which the detector 105 detects it. A reflected optical pulse 110 from the target 112 then acts as a timing signal for the timing unit 106 to determine time between the transmission and the reception of the optical pulse 110.

Similarly, a moment of the transmission of the optical pulse 110 from the transmitter 102 may correspondingly be detected by the detector 105 on the basis of the reference optical pulse 111, which may be directed to the receiver 104 within the range imaging apparatus. However, the moment at which the range imager outputs the optical pulse 110 may alternatively or additionally be determined on the basis of an electrical signal which generates the optical pulse 110.

As explained, the range imaging apparatus 100 may comprise the timing unit 106 for measuring the time interval between the transmission and the detection of the optical pulse 110. The detector 105 and the timing unit 106 may be connected such that the detector 105 may signal the timing unit 106 about the arrival of the optical pulse 110, 111 and the timing unit 106 may determine their timing.

The timing unit 106 may comprise a time-to-digital converter 108. The timing unit 106 may comprise an input/output (I/O) interface, such as a computer port for providing communication and signalling capabilities. The timing unit 106 may comprise a clock for synchronized operation, timing the detections of optical pulse 110 on the basis of electrical pulses from the detector 105 and measuring time related to transmission and reception moments of the optical pulse 110. A person skilled in the art is familiar with the timing unit 106 having a time-to-digital converter 108, per se.

The target zone 114 may be defined as a field which is measurable with all the optical beams of the range finder apparatus.

Figure 3A:
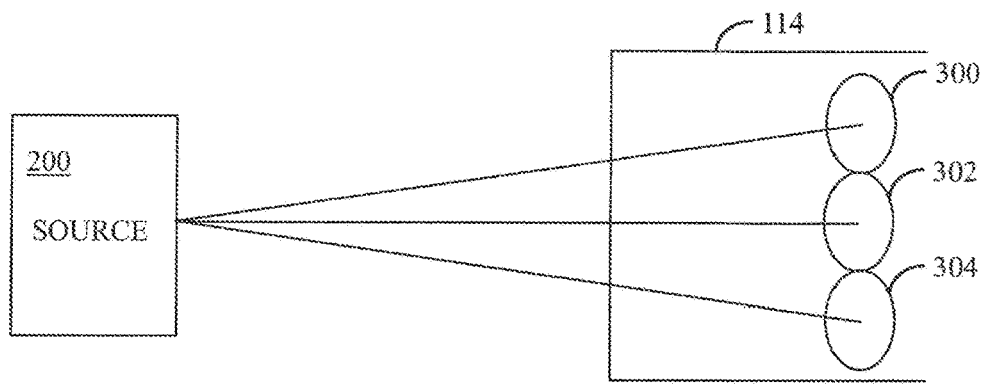
FIGS. 3A and 3B illustrate examples of optical beams.
Figure 3B:
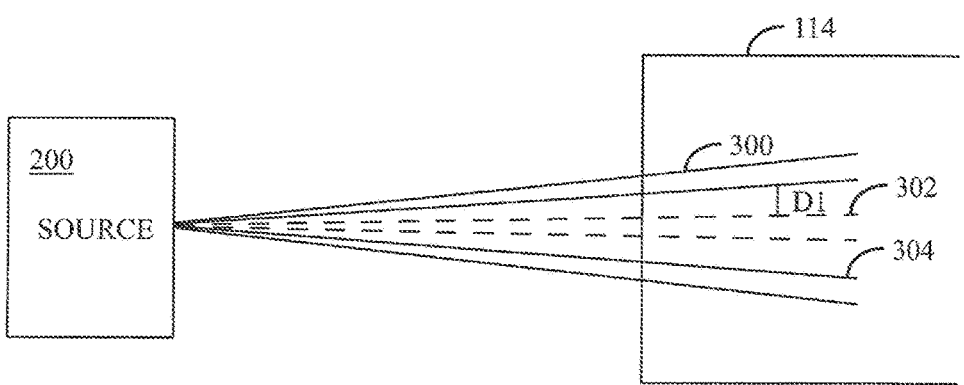

FIGS. 3A and 3B illustrate examples of the range imaging apparatus, which comprises the semiconductor laser source 200. The semiconductor laser source 200 may comprise at least one bulk laser, quantum-well laser, vertical-cavity surface-emitting laser (VCSEL). The laser may be an array of the bulk lasers, quantum-well lasers, VCSEL lasers or any combination of them. The duration of the optical pulse 110 may range from picoseconds to tens of nanoseconds, for example. As an example, the shortest optical pulse 110 width W may be about 50 ps, for example. As an example, the longest optical pulse 110 width may be about 10 ns, for example. A person skilled in the art is familiar with semiconductor laser sources 200, per se.

The semiconductor laser source 200 generates the optical pulse 110 at repeated moments, and outputs the optical pulse 110. The semiconductor laser source 200 forms a plurality of optical beams 300, 302, 304 towards the target zone 114 (for optical beams 300 to 304 see FIG. 4) such that different optical beams 300 to 304 are output at different moments. The at least two of optical beams 300 to 304 may be output sequentially one after another. The optical beams may be spatially separate. The spatially separate optical beams may have a distance therebetween and hence overlapping or they may be partially overlapping.

The semiconductor laser source 200 generates one of the optical beams 300 to 304 at each of the repeated moments. Each of the spatially separate optical beams 300, 302, 304 are output at a unique moment, which deviates from a moment of an output of any other optical beam.

In an embodiment, a part of the optical beams 300 to 304 may be output at one moment on the basis of the generation of an optical pulse 110, and another portion of the optical beams 300 to 304 may be output at another moment on the basis of the generation of another optical pulse 110.

In an embodiment, each of the optical beams 300 to 304 may be output consecutively one after another on the basis of the consecutive generation of the optical pulse 110. The optical beams 300 to 304 can be considered to form illuminated segments in the target zone 114.

The optical beams 300 to 304 may be partly overlapping in the target zone 114, or non-overlapping in the target zone 114. The spatially separate optical beams 300 to 304 may be touching but not intersecting in the target zone 114, which is illustrated in FIG. 3A. The spatially separate optical beams 300 to 304 that are non-overlapping may have a distance therebetween in the target zone 114, which is illustrated in FIG. 3B. The semiconductor laser source 200 provides illumination over the target zone 114 with the separate optical beams 300 to 304. In an embodiment, the illumination may be provided by different optical beams 300 to 304 at different moments.

In the embodiment in which the semiconductor laser source 200 provides the spatially separate optical beams 300 to 304 that may overlap each other (see additionally FIG. 12), the semiconductor laser source 200 also provides variation of optical power in the target zone 114 and on the target 112. The variation of the optical power in the target zone 114 may be considered inhomogeneous illumination. The illumination is caused by the spatially separate optical beams 300 to 304 and their combination has not been homogenized by a diffusor or the like. However, each beam may have separately been homogenized by a diffusor such that each of the at least one sub-source unit has a separate diffusor. In the inhomogeneous illumination, the optical radiation is distributed unevenly in the target zone 114.

In embodiments of FIGS. 3A to 3B the illumination is provided to the target zone 114 in segments, each segment being illuminated by one optical beam 300 to 304 and different segments being illuminated with different optical beams 300 to 304. A segment may have a variety of shapes. The segment may be a circle, a rectangle or an ellipse, for example. A segment may be symmetrical or non-symmetrical. FIGS. 4, 8 to 12 show rectangle segments of the optical beams 300 to 304 as examples.

Figure 3C:
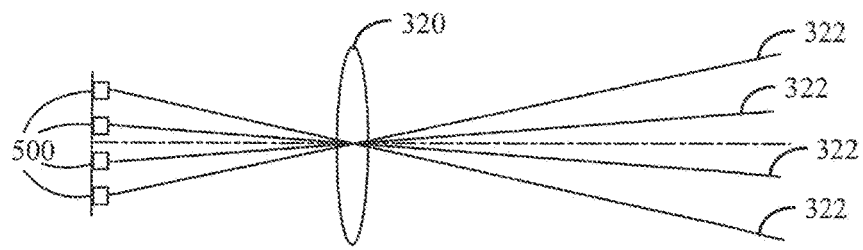
FIG. 3C illustrate an example of forming an image of the sub-source units over the target zone for illuminating it with spatially separate optical beams.
Figure 8:
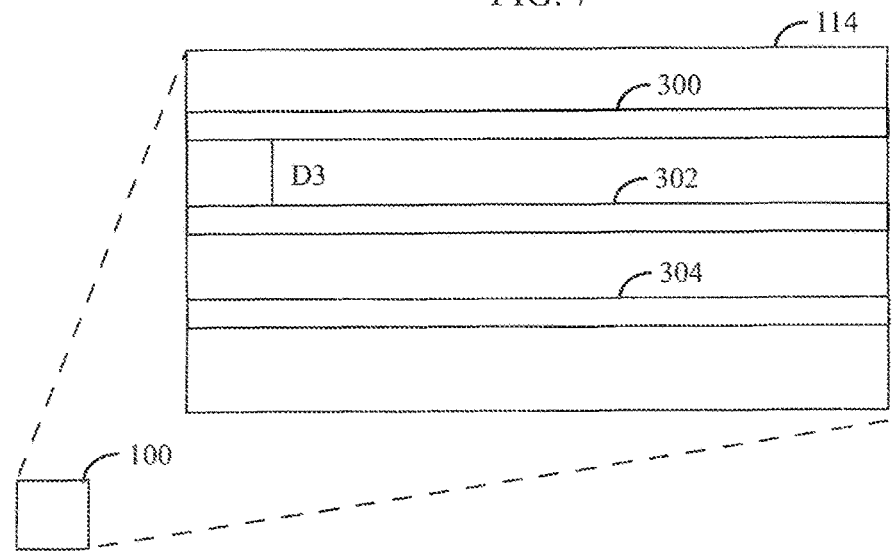
FIG. 8 illustrates an example of optical beams that are elongated.

FIG. 3C illustrates an example in which sub-source units 500 (see also FIG. 5) may be located on a focal plane of an objective lens 320 of the transmitter 102. The objective lens 320 may form an image of the sub-source units 500 in infinity in different directions of axes 322, which show the direction of the optical beams 300 to 310. In this manner, the optical beams 300 to 310 remain spatially separate, and they may be partially overlapping (see also FIG. 4) or non-overlapping (FIG. 8). The field-of-views of the sub-detector units 600 (see also FIG. 6A) behave in a corresponding manner. The sub-source units 500 need not to be located on the focal plane of the objective lens 320 although it may be practical in many cases.

Figure 4:
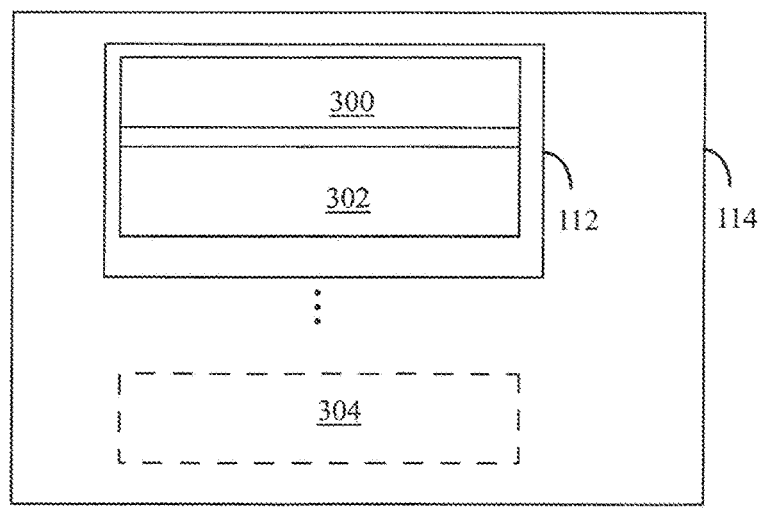
FIG. 4 illustrates an example of cross sections of non-overlapping optical beams.

As shown in FIG. 4, the partially overlapping optical beams 300 to 304 may provide illuminated rectangles of the optical beams 300 and 302 on the target 112. The beam 304 does not hit the target 112 in this example and it is marked with a dashed line. In this manner, the optical beams 300 to 304 may cover a two-dimensional surface in the target zone 114 in an embodiment.

Figure 5:
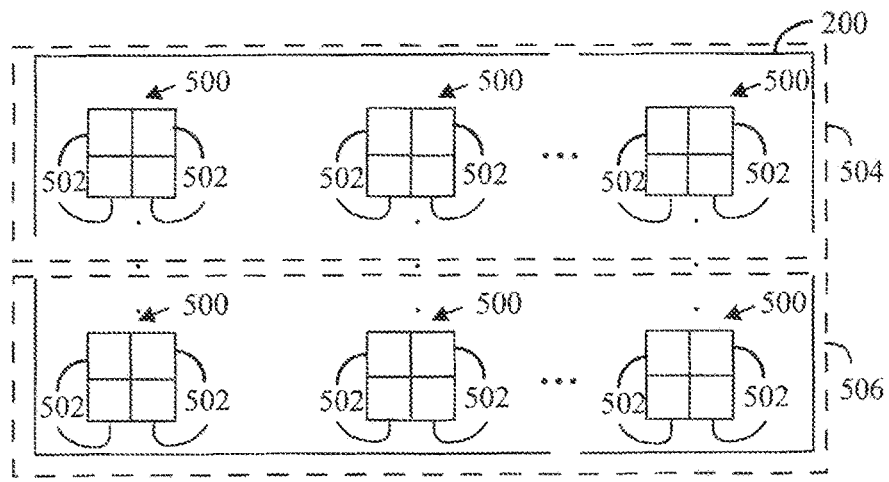
FIG. 5 illustrates an example of a semiconductor laser with a plurality of sub-source units.

FIG. 5 illustrates an example of the semiconductor laser source 200. In an embodiment, the semiconductor laser source 200 may comprise a plurality of sub-source units 500 each of which may output a unique optical beam 300 to 304. That is, one of the sub-source units 500 outputs an optical beam 300 to 304 which is different from an optical beam 300 to 304 output by any other sub-source unit 500. In an embodiment, a first group 504 of the sub-source units 500 may output its optical beam at different moment from a second group 506 of the sub-source units 500. Each of the first group 504 and the second group 506 of the sub-source units 500 may comprise one or more sub-source units 500. The number of groups 504, 506 of the sub-source units 500 is at least two. In an embodiment, the first group 504 of sub-source units 500 and the second group 506 of sub-source units 500 may have no common sub-source unit 500. There may be a plurality of rows and columns of the sub-source units 500 in the semiconductor laser source 200. The laser source 200 may comprise one or more laser bars, one or more laser chips each of the laser bars and laser chips having more than one sub-source unit 500. Alternatively or additionally, the laser source 200 may comprise a plurality of separate sub-source unit components. Still alternatively or additionally, the laser source 200 may comprise one or more VCSEL-lasers.

In an embodiment, at least one of sub-source units 500 comprises one or more laser elements 502 each of which may generate the optical pulse 110. The one of more laser elements 502 of one of the sub-source units 500 may generate the optical pulse of one of the optical beams 300 to 304. When a sub-source unit 500 generates an optical pulse 110, all laser elements 502 of the sub-source unit 500 generate the optical pulse 110. In this manner, a bright optical pulse 110 in each of the optical beams 300 to 304 can be generated.

In an embodiment, an electrical power fed to the semiconductor laser unit 200 for generating the optical pulse 110 may depend on a number of the sub-source units 500 that are used to output the optical pulse 110. In this embodiment, a ratio between a power P1 fed to a number K of the sub-source units 500 and a power P0 fed to all (KA) of the sub-source units 500 may be higher than a ratio of the number K of the sub-source units 500 and a number KA of all of the sub-source units 500 when K is smaller than KA. Mathematically this can expressed as P1/P0>K/KA. The power P0 fed to all sub-source units 500 i.e. to the transmitter 102 may be based on a manufacturer's datasheet. The nominal electrical power required by each sub-source unit 500 or by the transmitter 102 is given in the datasheet. If only a part of the sub-source units 500 are used, the electrical power fed to the at least one sub-source unit 500 in said part may be overdriven such that the electrical power fed to the part is higher than the nominal electrical power. In a pulsed mode, that can be done. In this manner, brightness of the at least one beam 300 to 304 can be increased with a decreasing number of the sub-source units 500 used output it/them.

In an embodiment, the apparatus comprises an electric power source 192 which may supply a constant electric power to the semiconductor laser source 200 at each of the repeated moments in order to increase brightness of the optical beams 300 to 304. The constant electric power may be the electric power meant for all the sub-source units 500 in the semiconductor laser source 200. The constant electric power fed to V sub-source units 500 may be the electric power meant for F sub-source units 500 of the semiconductor laser source 200, where V and F are positive integers, F being larger than V, i.e. F>V. The constant electric power may be the electric power meant for F or all the sub-source units 500 may be defined by the manufacturer of the sub-source units 500, for example. Typically, the electronic circuit that provides the electric current drive pulse cannot generate a high amplitude for a short pulse. Thus, the electric current drive pulse may be more efficient for V sub-source units 500 of the semiconductor laser source 200 than for F sub-source units 500 of the semiconductor laser source 200.

An amplitude of an electric current drive pulse may limit a duration of the optical pulse. Because of that, the amplitude of an electric current drive pulse may additionally or alternatively be used to control the duration of the optical pulse in an embodiment.

In an embodiment, the electrical power for generating the optical pulse 110 with the semiconductor laser source 200 may be kept constant irrespective of the number of the sub-source units 500 that are used to output the optical beams.

In these manners, brightness of the at least one beam 300 to 304 can strongly be increased with a decreased number of the sub-source units 500 used output it/them. In these embodiments, the sub-source units 500 may be overdriven.

In an embodiment an example of which is illustrated in FIG. 5, the plurality of the sub-source units 500 may be arranged two-dimensionally. A norm of the plain surface of the two-dimensional arrangement of the sub-source units 500 may be parallel to the optical axis.

Figure 6A:
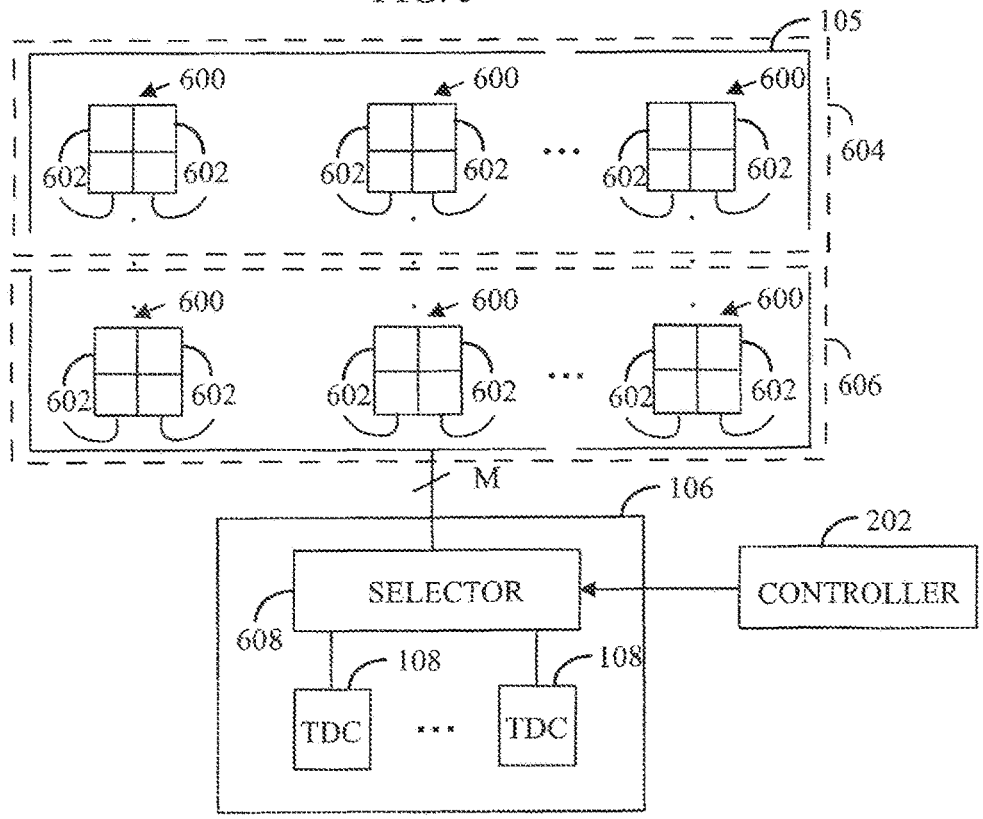
FIG. 6A illustrates an example of a detector with a plurality of sub-detector units.

FIG. 6A illustrates an example of the detector 105 and a timing unit 106. The detector 105 comprises a plurality of single-photon sub-detector units 600 that may have separate field of views towards the target zone 114. In an embodiment, a first group 604 of sub-detector units 600 may be associated with only one of the spatially separated optical beams 300 to 304 on the basis of the separate field-of-views (matched with the optical beams 300 to 304 in the target zone 114), while a second group 606 of the sub-detector units 600 may be associated with other spatially separated optical beams 300 to 304. Any two different groups 604, 606 of sub-detector units 600 having no common sub-detector unit may be associated with different spatially separated optical beams 300 to 304 on the basis of the separate field-of-views. A group 604, 606 of sub-detector units 600 may comprise one or more sub-detector units 600. In an embodiment, a group 604, 606 of sub-detector units 600 may comprise at least two sub-detector units 600. A number of groups 604, 606 of the sub-detector units 600 is at least two. The detector 105 may comprise a c×w matrix of the sub-detector units 600, where c and w are positive integers equal to or larger than two. In an embodiment, c and w are positive integers equal to or larger than three.

At least two groups 604, 606 of the single-photon sub-detector units 600 have separate field of views 900 to 904 towards the target zone 114, and the at least two groups 604, 606 of sub-detector units 600 are associated with different optical beams of the spatially separated optical beams 300 to 304 on the basis of the separate field-of-views 900 to 904.

In an embodiment, the field-of-views may be non-overlapping or partly overlapping. When a pulse 110 of optical radiation hits any of the sub-detector units 600, the sub-detector unit 600 outputs an electric signal for the timing unit 106. The sub-source units 600 may be single-photon avalanche diodes.

In an embodiment, the separate field-of-views may be matched with the optical beams 300 to 304 such that only one optical beam 300 to 304 is in one field-of-view. The matching may be made during manufacture of the range imaging apparatus by simple optical adjustments, for example.

The timing unit 106 determines a value, which corresponds to a time-of-flight of an optical pulse 110 generated at a moment of the repeated moments, on the basis of the electric signal from each of the sub-detector units 600 associated with an optical beam 300 to 304 output at said moment as a response to a detection of the optical pulse 110. Any one group 604, 606 of the sub-detector units 600 is associated only with the one or more optical beams 300 to 304 output at said moment.

In conjunction with a moment of generation of the optical pulse 110, the detection of the optical pulse 110 is performed only with the sub-detector units 600 the field-of-views of which are directed to a sub-zone of the target 114 zone, which is illuminated by the optical pulse 110 of that moment. The sub-zone is common with that of the optical beams 300 to 304 output at said moment. In an embodiment, the number of groups 604, 606 of the sub-detector units 600 and the number of the optical beams 300 to 304 may be the same. In an embodiment, the number of groups 504, 506 of the sub-source units 500 generating the optical pulse 110 at a moment and the number of groups 604, 606 of the sub-detector units 600 detecting the optical pulse 110 generated at said moment may be the same. In an embodiment, the number of the groups 504, 506 of the sub-source units 500 generating the optical pulse 110 at a moment, and the number of groups 604, 606 the sub-detector units 600 detecting the optical pulse 110 generated at said moment may be different. At least one group 604, 606 of the sub-detector unit 600 detects an optical pulse 110 output at a moment, and a different group 604, 606 of the sub-detector units 600 detect optical pulses 110 output at successive moments.

The timing unit 106 determines a value, which corresponds to a time-of-flight of the optical pulse 110 generated at a moment of the repeated moments, on the basis of a signal from each of the sub-detector units 600, which are associated with and receive the optical beam 300 to 304 output at said moment. As to any of the optical pulses output one after another, the timing unit 106 determines a value corresponding to a time-of-flight of the optical pulse output at each of the moments on the basis of signals from a group of the at least two groups 604, 606 of the sub-detector units 600 associated with an optical beam 300 to 304 output at said moment. The elements 602 of the group 604, 606 of the sub-detector units 600 that are designed to receive the optical beam may perform detection and output the signals for determination of the time-of-flight. Different groups 604, 606 of the at least two sub-detector units 600 perform a detection of the optical pulse and output signals at different moments because they receive different spatially separated optical beams 300 to 304 due to their differing field-of-views 900 to 904. In an embodiment, the timing unit 106 may comprise a selector 604 and a time-to-digital converter 108. The selector 604 may select the sub-detector units 600, which receive the optical pulse 110 and deselects the sub-detector units 600 that do not receive the optical pulse 110. The selection and deselection of the sub-detector units 600 may be made on the basis of the output optical beams 300 to 304 and/or the sub-source units 500 generating the optical pulse 110 in conjunction with each moment. In an embodiment, the time-to-digital converter 108 may reside in the same chip as the single-photon avalanche diodes of the detector. In an embodiment, the time-to-digital converter 108 may reside in the different chip as the single-photon avalanche diodes of the detector.

In an embodiment, the selector 604 may select, in conjunction with each of the different moments, the sub-detector units 600 such as groups 604, 606, the field-of-views 900 to 904 of which have one-to-one relation with the output optical beam 300 to 304 output at said moment. The selector 604 may deselect a group or groups 604, 606 of the sub-detector units 600, which is/are out of reception of the output optical beam 300 to 304 at a moment of the generation of the optical pulse 110. That is, the selector 604 may select a group 604, 606, which receives the optical pulse 110, and deselect a group 604, 606, which does not receive the optical pulse 110.

Because the detector 208 may operate in the Geiger mode, its output is digital in nature. That is, the output voltage levels of the sub-detector units 600 may be set to conform to voltage levels of digital circuits which allows high measurement speed and accuracy. Their output also occurs in separate electrical pulses the number of which are easy to count. Namely, the electrical pulses are separated by dead time.

At least one single photon avalanche sub-detector unit 600 may detect the optical pulse 110 that has reflected from the target 112. Each of the sub-detector units 600 may output an electric signal of the level of the digital circuit in response to detection of the optical pulse 110.

A number N of the time-to-digital converters 108 may be smaller than a number M of the single sub-detector units 600 of the matrix 300, i.e. N<M. That is, the receiver 104 may be made simpler than in a case where every sub-detector units 600 has its own time-to-digital converter 108. When the at least one beam 300 to 304 hits only a part of the sub-detector units 600, it is unnecessary complexity and space consumption to have the time-to-digital converters 108 for each sub-detector unit 600. In an embodiment, groups 604, 606 of sub-detector units 600 may be connected with the time-to-digital converters 108 one by one synchronously with the repetition of the optical pulse 110. Then a group 604, 606 that receives the optical pulse 110 is connected with the time-to-digital converters. When a new optical pulse 110 is transmitted to different direction, another group 604, 606 that receives the optical pulse 110 is connected with the time-to-digital converters.

The receiver selector 608 may connect a number of the sub-detector units 600, which detect the optical pulse 110 and the number of which corresponds to the number of output beams 300 to 304, with the number of the time-to-digital converters 108.

In an embodiment, the semiconductor laser source 200 may provide homogeneous illumination within each of the separate optical beams 300 to 304. The semiconductor laser source 200 may provide an inhomogeneous illumination per optical pulse over the target zone 114 with the separate optical beams 300 to 304. The target zone 114 may, however, be homogenously illuminated with a plurality of optical pulses.

In an embodiment an example of which is illustrated in FIG. 6A, at least one of sub-detector units 600 may comprise one or more detector elements 602 each of which may detect the optical pulse 110. The detector elements 602 of a single group 604, 606 of the sub-detector units 600 may detect the optical pulse of a single optical beam 300 to 304.

Figure 6B:
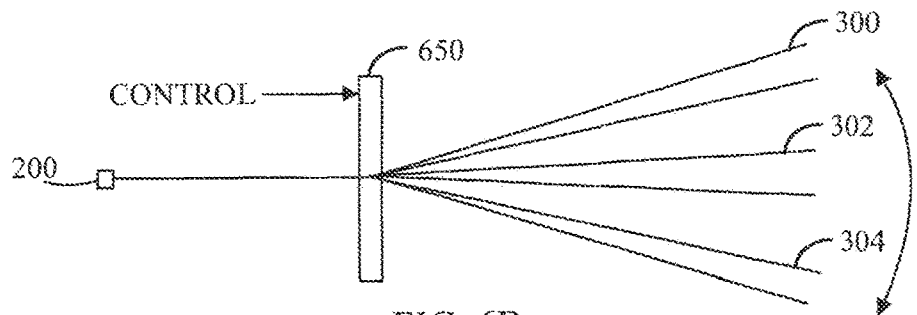
FIG. 6B illustrates an example of an optical beam deflector.

In an embodiment an example of which is illustrated in FIG. 6B, an optical beam deflector 650 may deflect the optical beams 300 to 304 generated by the laser source 200 at successive moments to different directions in the target zone 114. The operation of the optical beam deflector 650 may be controlled by the controller 202, for example. This kind of arrangement makes it possible scan over the target zone 114. The optical beam deflector 650 may comprise an electro-mechanical deflector (such as MEMS (Micro-Electro-Mechanical System)), an acousto-optic deflector, an electro-optic deflector, any combination these or the like, for example. In this embodiment, the transmitter 104 may have a single group 504 (or 506) of the sub-source units 500, and the successively output optical beams 300 to 304 may originate from said single 504 group of sub-source units 500. However, the transmitter 104 may alternatively have a plurality of groups 504, 506. An objective lens 320 with the one or more groups 504, 506 may be used in a manner similar to the embodiment illustrated in FIG. 3C.

Figure 7:
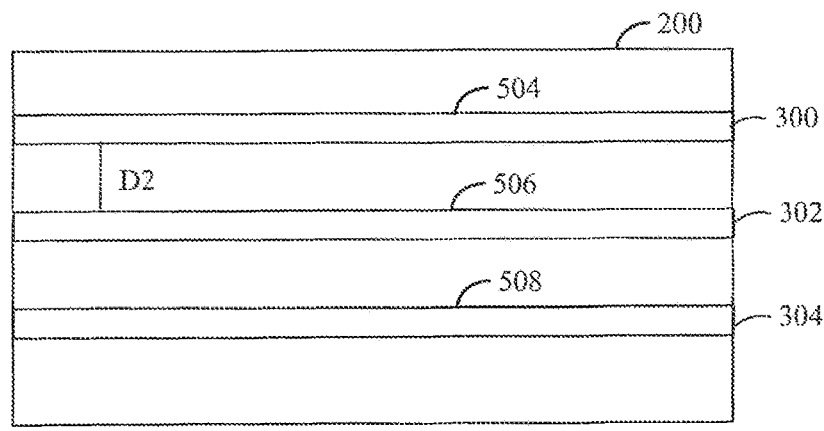
FIG. 7 illustrates an example of sub-source units that are oblong.

In an embodiment an example of which is illustrated in FIG. 7, a group 504, 506, 508 of the plurality of the sub-source units 500 may have a form of a o longitudinal shape such as a rectangle. The group 504 to 508 of a longitudinal shape may have a plurality of sub-source units 500 side by side. The longitudinal shape may refer to a row, column or the like. Thus, the group 504 to 508 may be vertical, horizontal or slanted. Each of the optical beams 300 to 304 of each group 504 to 508 of the sub-source units 500 may cover the target zone 114 in one dimension and only partly in another dimension. Different groups 504 to 508 of the sub-source units 500 may output the optical beams 300 to 302, which are output at different moments and which are spatially separate. Although FIG. 7 shows only three groups 504 to 508 outputting the optical beams 300 to 304 the number of groups and the optical beams is not limited to that.

A group 504 to 508 of the sub-source units 500 may comprise an e×f matrix of sub-source units 500, where e and f are positive integers and either e is smaller than for f is smaller than e. A total number of the sub-source units 500 may be g×h, where g and h are positive integers and both e may be smaller than g and f is smaller than h. It is also possible that e is equal to g but f is smaller than h. Furthermore, it is possible that e is smaller than g but f is equal to h.

Correspondingly, a group 604, 606 of the plurality of the sub-detector units 600 may have a form of a longitudinal shape. The longitudinal shape may be rectangle or the like. The group 604, 606 of a longitudinal shape may have a plurality of sub-detector units 600 side by side. The longitudinal shape may refer to a row, column or the like. Thus, the group 604, 606 may be vertical, horizontal or slanted.

The group 604, 606 may comprise an r×s matrix of sub-detector units 600, where r and s are positive integers and either r is smaller than s or s is smaller than r. A total number of the sub-detector units 600 is c×w, where c and w are positive integers and both r may be smaller than c and s is smaller than w. It is also possible that r is equal to c but s is smaller than w. Furthermore, it is possible that r is smaller than c but s is equal to w.

In an embodiment, the plurality of the sub-source units 500 may output optical beams 300 to 304 sequentially in order to scan over the target zone 114. In an embodiment, the groups 504 to 508 of the sub-source units 500 may output optical beams 300 to 304 sequentially in order to scan over the target zone 114. The scanning may be performed line by line, row by row, column by column or the like, also in a slanted manner. The scanning may be performed utilizing the matrix form explained above. In an embodiment, any two of the optical beams 300 to 304 (directly) adjacent to each other may have a minimum first distance D1 therebetween in the target zone 114 (see FIG. 3B). A value of the first distance D1 may be zero or larger than zero, i.e. D1≥0. That is, the optical beams 300 to 304 may be touching each other or they may be spaced apart from each other.

In an embodiment, the first distance D1 between any two directly adjacent discrete optical beams 300 to 304 may be larger than a diameter of one of the optical beams 300 to 304. In an embodiment, cross sections i.e. segments of the optical beams 300 to 304 are round disks or rectangles of homogeneous illumination, for example.

In an embodiment an example of which is illustrated in FIG. 7, each of the groups 504 to 508 of the sub-source units 500 may be elongated extending in one dimension over the semiconductor laser source 200 for outputting correspondingly elongated optical beams 300 to 304. The groups 504 to 508 of the sub-source units 500 may have a second distance D2 therebetween in another dimension over the semiconductor laser source 200. A value of the second distance D2 may be zero or larger than zero, i.e. D2≥0. That is, the groups 504 to 508 of the sub-source units 500 may be touching each other or they may be spaced apart from each other. In an embodiment, cross sections of the field-of-views are similar to the cross sections of the optical beams 300 to 304.

FIG. 8 illustrates an example of the elongated optical beams 300 to 304. Only three spatially separated optical beams 300 to 304, which provide a stripe-like or rectangle illumination of the target zone 114, are shown but the number of the optical beams is not limited to this number. The elongated optical beams may have a third distance D3 therebetween, the third distance D3 being dependent on the second distance D2. A value of the third distance D3 may be zero or larger than zero, i.e. D3≥0. That is, the elongated optical beams may be touching each other or they may be spaced apart from each other.

This kind of illumination of elongated optical beams 300 to 304 may be produced by a laser diode bar (several emitting stripes) and a cylinder lens system or a holographic diffuser, for example.

The stripe-like illumination with elongated optical beams 300 to 304 (in a form of rows, columns or the like) enables the range imaging apparatus 100 to produce a distance profile (or several horizontal or vertical profiles with a set angular deviation) within the field-of-view (FOV) of the system (2D range image). For example, with a FOV of 50° and 256 pixel in the line receiver, the angular resolution would be ~3 mrad (which corresponds to ~3 cm at the distance of 10 m as transversal resolution). The motivation to use stripe-like illumination may be the fact that by doing so the total energy seen by the single-photon avalanche diode (SPAD) pixel is much higher than in a homogenous 2D illumination for the whole target zone 114 at a time. This speeds up the measurement and further mitigates the background illumination issue. On the other hand, in many practical applications, the profile information is just what is needed. Consider, for example, the use of such a 2D range imager to record the working environment of an excavator. In this application, the boom of the excavator moves in the vertical direction and thus the successive line profiles measured in the horizontal direction produce in fact a 3D range image of the working environment.

Figure 9:
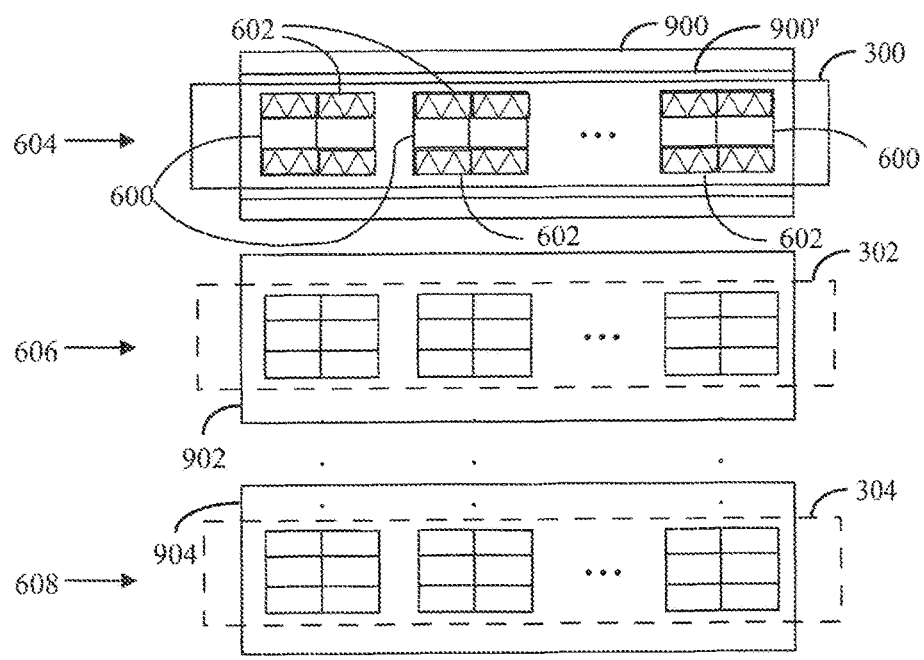
FIGS. 9 to 11 illustrate examples of illumination of the target zone.

FIG. 9 illustrates an example of illumination of the target zone 114 is performed with narrow optical beams 300 to 304 which are detected using narrow field-of-views 900, 902, 904 of the groups 604 to 608 of the sub-detector units 600, the field-of-views 900 to 904 being overlapped with the optical beams 300 to 304 in the target zone 114. Each optical beam 300 to 304 is output at a unique moment. Then the at least two different optical beams 300 to 304 are detected using different groups 604, 606, 608 of sub-detector units 600 on the basis of their different field-of-views 900 to 904. The number of the different field-of-views 900 to 904 may be the same as the number of the different optical beams 300 to 304 illuminating different segments of the target zone 114. In an embodiment, detector elements 602 that do not receive the optical beam 300, i.e. no light of the optical beam 300 is within their field-of-views, may be deselected from the detection. The deselection may mean that the detector elements 602 are decoupled from the time-to-digital converters 108 thereby preventing the determination of the time-of-flights. Alternatively or additionally, the deselection may mean that operational electric power of the detector elements 602 is switched off. The controller may perform the deselection. In FIG. 9, the deselected detector elements 602 are marked with hatching. With the deselection, the field-of-view 900 of the group 604 of the sub-detector units 600 may become narrower which is illustrated as a field-of-view 900' in FIG. 9. The narrower field-of-view 900' may gather less noise from the environment. If the target 112 is moving or oscillating, only the detector elements 602 that receive light from the target can be selected, which is an advantage.

Figure 10:
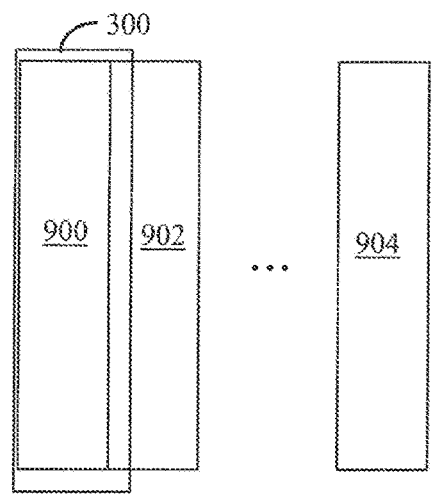
Figure 11:
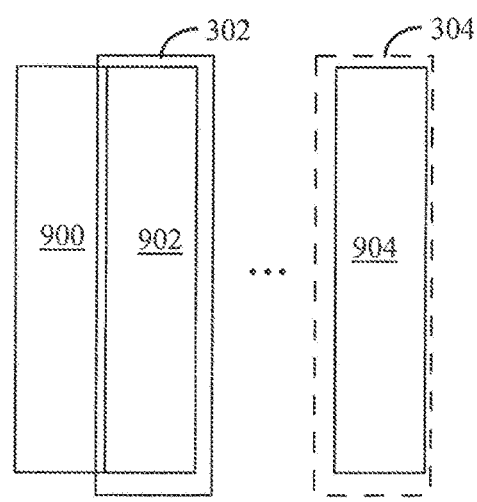

FIGS. 10 and 11 illustrate an example where the optical beams 300 to 302 are output one after another. An optical beam 300 may be output with a first optical pulse 110 which is illustrated in FIG. 10. Correspondingly, only the sub-detector units 600 of a group 604, 606, which provide the field-of-view 900, are coupled with the time-to-digital converters 108 for determining the time-of-flights. Alternatively or additionally, electrical power supply may be switched on for the sub-detector units 600 of said group 604, 606, which provide the field-of-view 900 whereas the electrical power supply for the sub-detector units 600 outside said group 604, 606, which provide the other field-of-views 902, 904, may be switched off by the selector 608. Also here, the narrower field-of-view achieved with selected groups may gather less noise from the environment. If the target 112 is moving or oscillating, only the groups 604, 606 that receive light from the target can be selected, which is an advantage.

An optical beam 302 may be output with a second optical pulse 110 which is illustrated in FIG. 11. Correspondingly, only the sub-detector units 600 of a group 604, 606, which provide the field-of-view 902 are coupled with the time-to-digital converters 108 for determining the time-of-flights. Alternatively or additionally, electrical power supply may be switched on for the sub-detector units 600 of said group 604, 606, which provide the field-of-view 902 whereas the electrical power supply for the sub-detector units 600 outside said group 604, 606, which provide the other field-of-views 900, 904, may be switched off by the selector 608.

For the next, an optical beam 304 shown with a dashed line in FIG. 11 may be output with a third optical pulse 110 and only the sub-detector units 600 of a group 604, 606, which provide the field-of-view 904 may be coupled with the time-to-digital converters 108 for determining the time-of-flights (not shown in Figures). In this manner, the range imaging apparatus may scan over the target zone 114. This kind of scanning may be applied to elongated optical beams 300 to 304 illustrated in FIG. 8. Then the elongated beams 300 to 304 may be output one after another towards the target zone 114. Although the field-of-views 900 to 904 have been drawn non-overlapping in FIGS. 10 and 11 and they may be non-overlapping, directly adjacent field-of-views 900, 902, 904 may be partially overlapping in an alternative solution.

Figure 12:
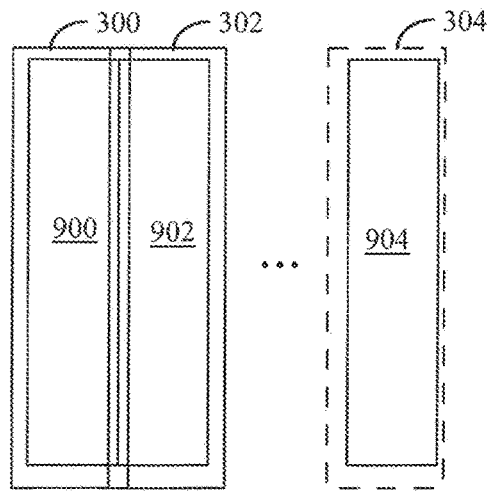
FIG. 12 illustrates an example where at least one sub-source unit, i.e. at least one optical beam can be adaptively selected.

FIG. 12 illustrates an example of an embodiment in which at least one sub-source unit 500, i.e. at least one optical beam 302 and 302 may be adaptively selected to be used one after another while other at least one sub-source unit 500, i.e. other at least one optical beam 304, may be selected to be inactive during a measurement. Sub-detector units 600 with the suitable field-of-views 900, 902, which are directed to the areas illuminated by the selected optical beams 302 and 302, may correspondingly be selected in use. Then the sub-detector units 600 with the field-of-view 904 may be deselected such that they are not used in the measurement. The adaptive selection of the optical beams 300 to 302 and corresponding field-of-views 900 to 902 may be performed in any desired manner. By selecting less optical beams than the maximum number of the optical beams 300 to 304 speeds up the measurement. The adaptively selected optical beams 302 and 302 may be directed to the target 112 and the rest of the optical beams may be directed to background but the at least one beam directed outside the target 112 is not used in this example. When the target 112 moves, the adaptive selection may select, on the basis of the movement, the optical beams, which are directed to the moving target 112. The selection may be based on the determined distance of the target 112, which differs from that of the background, and the optical beams which detect a change in distance. In an embodiment, new selection of the optical beams 300 to 304 may be made only if the change in distance crosses a threshold. At least one new optical beam may be output adjacent to the previously selected optical beams with which no change in distance or a change not crossing the threshold is detected. The optical beams with which the change in distance, which may cross the threshold, is detected, may be de-activated. The controller 202 may control the adaptive selection of the optical beams and the sub-detector units 600.

Figure 13:
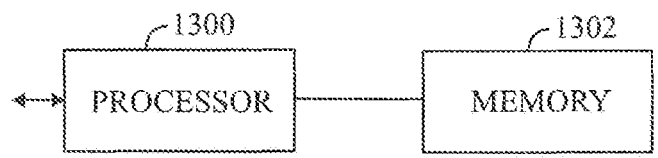
FIG. 13 illustrates an example of a controller of the range imaging apparatus.

FIG. 13 illustrates an example of an embodiment where the controller 202 may comprise one or more processors 1300 and one or more memories 1302 including a suitable computer program code. The one or more memories 1302 and the computer program code with the one or more processors 1300 may control the operation of the range imaging apparatus 100.

In an embodiment, the one or more processors 1300 and the one or more memories 1302 with the computer program code may select, in conjunction with each of the different moments of the generation of the optical pulse 110, the sub-detector units 600 the field-of-views 900 to 904 of which have one-to-one relation to the output optical beams 300 to 304. The one or more processors 1300 and the one or more memories 1302 with the computer program code may deselect, in conjunction with each of the different moments of the generation of the optical pulse 110, at least one of the sub-detector units 600 which is out of reception of the output optical beams 300 to 304 in conjunction with a moment of the generation of the at least one optical pulse. The deselection may mean that the sub-detector units 600 are not connected with the time-to-digital converter(s) 108.

The explained embodiments improve signal-to-noise ratio and enable a fast range imaging. Even in the case when the number of optical beams for each optical pulse is lower than the maximum number of optical pulses, the range imaging may counterintuitively be made faster than a measurement using illumination covering the whole target zone 114 with each optical pulse.

Figure 14:
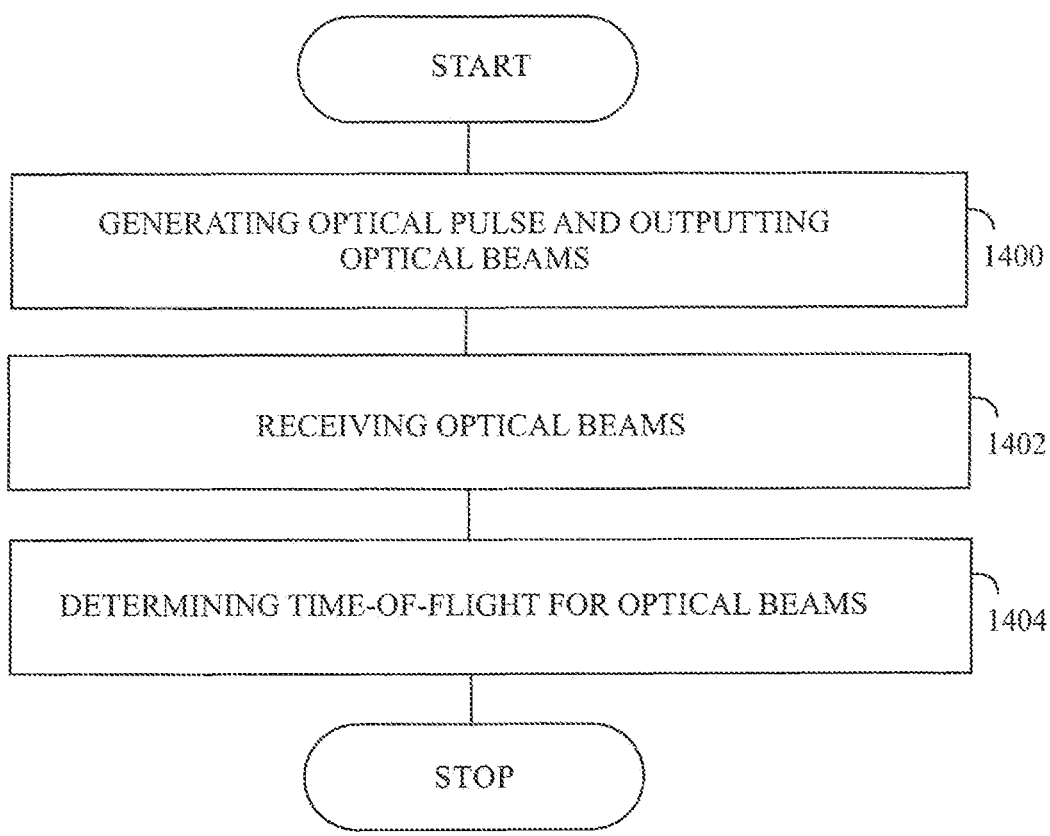
FIG. 14 illustrates of an example of a flow chart of a range imaging method.

FIG. 14 is a flow chart of the range imaging method. In step 1400, an optical pulse 110 is generated repeatedly and spatially separate optical beams 300 to 304 are output towards a target zone 114 such that each of the separate optical beams (300 to 304) is output at different moments. In step 1402, the optical beams 300 to 304 are received by a detector 105 comprising single-photon sub-detector units 600, at least two groups 604, 606 of the sub-detector units 600 having separate field of views 900 to 904 towards the target zone 114, and each of the at least two groups 604, 606 of the sub-detector units 600 being associated with different optical beams 300 to 304 on the basis of the separate field-of-view 900 to 910. In step 1404, a value corresponding to a time-of-flight of the optical pulse 110 output at each of the repeated moments is determined on the basis of signals from the sub-detector units 600 of a group 604, 606 associated with an optical beam 300 to 304 output at said moment.

The method shown in FIG. 14 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

In conclusion, an idea of the proposal is to concentrate the energy of the optical probe signal in time and/or space since this maximizes the available signal to noise ratio and thus the system performance. This is enabled by development of new laser diode and detector technologies used with the suggested illumination schemes.

In background conditions having high intensity optical noise, the receiver 104 may become blocked due to the detection of random background photons before the at least one photon from the target 114 enters the receiver 104. In this case, the detection probability of the at least one photon from the target 114 reduces exponentially (relative to $e^{-tt/tm}$, where tt is a transit time of the at least one photon from the target 114 and tm is a mean time interval between random photons). For this reason, in an embodiment it may be advantageous to lower the excess bias voltage of the SPAD in high background conditions. This reduces the signal-to-noise ratio in the sense that the probability of the signal and background photon is reduced (e.g. from 2% to 4%). But, it also reduces the blocking effect (because, due to lowering the photon detection probability, the mean time is longer, i.e. 2 times longer with the above parameters). Thus, the total signal-to-noise ratio may still be better with the reduced VSPAD (since the blocking effect reduces exponentially).

In this system, a portion of the transmitted photons reflect from the target 112 and/or the target zone 114 and hit the single-photon receiver 104 (with 2D detector array). In any of the single-photon sub-detector units 600, the photon may get detected as a result of a high-speed breakdown in the sub-detector units 600. The timing jitter of the detection may be in a CMOS single-photon detector at the level of 50 ps only. Moreover, the breakdown may introduce immediately a logic level signal (e.g. 3 V) and thus no analog amplifiers may be needed. In addition to the 2D array of the SPAD detectors, the receiver 104 also includes an array of time-to-digital converters (TDCs) 108. The functionality of the time-to-digital converters 108 is to measure the interval between the emitted laser pulse and the introduced breakdown in every SPAD pixel that detected a photon. These intervals are the transit times (Δt) of the photons from the transmitter 102 to the target 112 and/or target zone 114 and back to the receiver 104. Since every sub-detector unit 600 sees only a portion of the field-of-view 900 to 904 of the receiver 104 defined by its relative position in the array (due to optics), a 2D/3D range image can be achieved, an potentially in a flash mode. In this 2D/3D range image, the x- and y coordinates are produced by the location of the sub-detector unit 600 in the array and the z-coordinate by the measured transit time (z=R=cΔt/2) of the photon introducing the breakdown in the corresponding sub-detector unit 600.

In one option of the illumination, the FOV of the system is illuminated with a 2D matrix of laser diodes (a VCSEL array), see FIGS. 8 to 11, for example. In order to get high enough signal-to-noise also in bright daylight conditions, the transmitter 102 may be realized with a VCSEL array and transmitter optics so that the illuminated FOV 900 to 904 includes a bunch of separate optical beams 300 to 304 with low divergence. For example, a FOV of 45° could be covered with an array of 30×20 pixels, giving an angle resolution of ~1.5°/~2°, respectively. The specific feature of this illumination technique is that contrary to homogenous illumination (which is traditionally used), the FOV 900 to 904 of the SPADs of the receiver matrix covers the whole target zone 114 but the FOV of the SPADs is designed and/or controlled to detect the reflected light from a part of the target zone 114 under illumination at each moment of the output optical pulses. In other words, the 30×20 SPADs of the receiver instantaneously detects the part of the target zone 114, which is illuminated by the corresponding sub-source units 500. This obviously effectively minimizes the background illumination power received by the receiver and thus also the random background hits. It will be obvious to a person skilled in the art that, as technology advances, the inventive concept can be implemented in various ways. The invention and its embodiments are not limited to the example embodiments described above but may vary within the scope of the claims.

The invention claimed is:

1. A range imaging apparatus, comprising:
a semiconductor laser source, which comprises groups, each of the groups comprising one or more sub-source units, and different groups being configured to generate an optical pulse at repeated moments, and output a plurality of spatially separate optical beams towards a target zone, such that different groups of the semiconductor laser source are configured to output each of the spatially separate optical beams at different moments from each other;
an electric power source, which is configured to supply a constant electric power to the one or more sub-source units at each of the repeated moments;
a detector comprising single-photon sub-detector units configured to receive the optical pulse reflected from the target zone, at least two groups of the single-photon sub-detector units being configured to have separate field of views towards the target zone, and the at least two groups of sub-detector units being associated with different optical beams of the spatially separated optical beams on the basis of the separate field-of-views; and
a timing unit configured to determine a value corresponding to a time-of-flight of the optical pulse output at each of the repeated moments on the basis of signals from the sub-detector units of a group associated with an optical beam output at said moment,
wherein a ratio (P1/P0) between a power (P1) fed to a number (K) of the sub-source units and a power (P0) fed to all (KA) of the sub-source units is higher than a ratio (K/KA) of the number (K) of the sub-source units and a number (KA) of all of the sub-source units, where (K) is smaller than (KA).

2. The apparatus of claim 1, wherein each of the groups is configured to output one of the optical beams.

3. The apparatus of claim 2, wherein at least one of the sub-source units comprises one or more laser elements, and the one of more laser elements of one of the sub-source units is configured to generate the optical pulse of one of the optical beams.

4. The apparatus of claim 1, wherein at least one of sub-detector units comprises one or more detector elements, and the one or more detector elements of one of the sub-detector units are configured to detect the optical pulse of one of the optical beams.

5. The apparatus of claim 2, wherein the plurality of the sub-source units are arranged two-dimensionally.

6. The apparatus of claim 2, wherein an optical beam of each of the groups is configured to cover the target zone in one dimension and only partly in another dimension; and different groups are configured to output the spatially separate optical beams at different moments.

7. The apparatus of claim 6, wherein the groups are configured to output the spatially separate optical beams sequentially in order to scan over the target zone.

8. The apparatus of claim 2, wherein any two of the optical beams adjacent to each other have a first distance (D1) therebetween.

9. The apparatus of claim 8, wherein the apparatus comprises an optical beam deflector configured to deflect the optical beams from the semiconductor laser source to different directions in the target zone.

10. The apparatus of claim 2, wherein each of the groups is elongated extending in one dimension over the semiconductor laser source for outputting an elongated optical beam; and the groups have a second distance (D2) therebetween in another dimension over the semiconductor laser source.

11. The apparatus of claim 1, further comprising:
one or more processors; and
one or more memories including computer program code;
wherein the computer program code is configured to, with the one or more processors, control the semiconductor laser source and the timing unit.

12. The apparatus of claim 11, wherein the computer program code is further configured to:
select, in conjunction with each of the different moments, the sub-detector units the field-of-views which have one-to-one relation with the output optical beam output at said moment, and
deselect at least one of the sub-detector units which are out of reception of the output optical beam at a moment of the generation of the optical pulse.

13. A range imaging method, the method comprising:
generating an optical pulse repeatedly and outputting spatially separate optical beams from different groups, each of the groups comprising one or more sub-source units, towards a target zone such that each of the optical beams is output as the optical pulse at different moments from each other;
supplying, by an electric power source, a constant electric power to the one or more sub-source units at each of the repeated moments;
receiving the optical pulse reflected from the target zone, by a detector comprising single-photon sub-detector units, at least two groups of the sub-detector units having separate field of views towards the target zone, and each of the at least two groups of the sub-detector units being associated with different optical beams on the basis of the separate field-of-views; and
determining a value corresponding to a time-of-flight of the optical pulse output at each of the repeated moments on the basis of signals from the sub-detector units of a group associated with an optical beam output at said moment,
wherein a ratio (P1/P0) between a power (P1) fed to a number (K) of the sub-source units and a power (P0) fed to all (KA) of the sub-source units is higher than a ratio (K/KA) of the number (K) of the sub-source units and a number (KA) of all of the sub-source units, where (K) is smaller than (KA).

14. The method of claim 13, wherein each of the groups is configured to output one of the optical beams.

15. The method of claim 14, wherein at least one of the sub-source units comprises one or more laser elements, and the one of more laser elements of one of the sub-source units is configured to generate the optical pulse of one of the optical beams.

16. The method of claim 14, wherein an optical beam of each of the groups is configured to cover the target zone in one dimension and only partly in another dimension; and different groups are configured to output the spatially separate optical beams at different moments.

17. The method of claim 16, wherein the groups are configured to output the spatially separate optical beams sequentially in order to scan over the target zone.

18. The method of claim 14, wherein any two of the optical beams adjacent to each other have a first distance (D1) therebetween.

19. The method of claim 18, further comprising deflecting the optical beams from the semiconductor laser source to different directions in the target zone.

20. The method of claim 13, further comprising:
selecting, in conjunction with each of the different moments, the sub-detector units the field-of-views which have one-to-one relation with the output optical beam output at said moment, and
deselecting at least one of the sub-detector units which are out of reception of the output optical beam at a moment of the generation of the optical pulse.

* * * * *